United States Patent [19]

Lee

[11] Patent Number: 5,036,251

[45] Date of Patent: Jul. 30, 1991

[54] DEVICE FOR CONTROLLING IMAGE PATTERN OF A COMPUTER-CONTROLLED TELEVISION

[75] Inventor: Kyoung-Guen Lee, Seoul, Rep. of Korea

[73] Assignee: SamSung Electronics Co., Ltd., Suwon, Rep. of Korea

[21] Appl. No.: 521,383

[22] Filed: May 10, 1990

[30] Foreign Application Priority Data

May 10, 1989 [KR] Rep. of Korea ............ 1989-6204[U]

[51] Int. Cl.⁵ ............................................. H01J 31/26
[52] U.S. Cl. ........................................ 315/10; 358/10
[58] Field of Search ............... 358/29, 10, 69; 315/10, 315/370, 368

[56] References Cited

U.S. PATENT DOCUMENTS 4,551,653 11/1985 Hilsum .................................. 315/10
4,868,668 9/1989 Tavernetti ............................ 358/10

Primary Examiner—Theodore M. Blum
Attorney, Agent, or Firm—Robert E. Bushnell

[57] ABSTRACT

There is disclosed a device for automatically controlling image pattern of a computer-controlled television by feeding back the image pattern displayed on the CRT screen by means of the video camera. The control device to feed back the image pattern includes a video camera faced to the CRT screen of the CCTV, for converting the image pattern into an electrical composite video signal; a RGB matrix for separating the composite video signal into the respective R, G, B components; a first, second and third analog-to-digital converters for respectively R, G, B components into corresponding R, G, B digital signals; a pattern recognizor for comparing the R, G, B components with reference values programmed in advance; and a control computer for providing deflection equalizing data to the CCTV to equalize the image pattern distorted, according to the comparing result of the pattern recognizor.

6 Claims, 2 Drawing Sheets

DEVICE FOR CONTROLLING IMAGE PATTERN OF A COMPUTER-CONTROLLED TELEVISION

BACKGROUND OF THE INVENTION

The present invention generally relates to a computer-controlled television (hereinafter, referred to as CCTV for short) and more particularly to a device for controlling the image pattern of a CCTV by using a video camera, wherein the image pattern displayed on a CRT (Cathode-Ray Tube) of the CCTV is fed back to the CCTV via the control device so as to equalize the image pattern distorted (mal-aligned) by an internal or external influence.

The known CCTV includes a microcomputer to control precisely the characteristics of geometry alignment of the image pattern displayed on the CRT and the sound characteristics thereof. In the CCTV, the horizontally or vertical distorted (shifted) image pattern and the mal-aligned image pattern can be adjusted by the internal microcomputer, according to a predetermined condition set up in advance.

According to the conventional CCTV, once the parameters for controlling the horizontal, vertical and alignment characteristics are set up, it is inconvenient to re-adjust the parameters set up in advance. Further, it is difficult to confirm that the system keeps controlling the above characteristics according to the parameters previously set up. Therefore, there arises a demand for automatically controlling the parameters.

SUMMARY OF THE INVENTION

It is accordingly an object of the present invention to provide a device for automatically controlling the geometry characteristics of the image pattern of a CCTV by feeding back the image pattern presently displayed on a screen of the CCTV.

It is another object of the present invention to provide a device for automatically controlling the sound characteristics of the CCTV by feeding back the sound signal.

According to an aspect of the present invention, a device for controlling the geometry characteristics of an image pattern in a CCTV includes: a pattern generator for producing to the CCTV the image pattern containing a synchronous signal; a video camera for sensing the image pattern and converting the image pattern into an electrical composite video signal; an RGB matrix for separating the composite video signal into red, green, and blue components; first, second and third ADC's for converting the red, green and blue components into red, green and blue digital signals, respectively; a pattern recognizor for providing the synchronous signal provided from the pattern generator, the synchronous signal being coupled to the respective first, second and third ADC's, whereby the first, second and third ADC's synchronize with the pattern generator; a pattern recognizor for comparing the output of the first, second and third ADC's with a reference programmed in advance to control the CCTV, and producing parameters for respective horizontal, vertical and alignment characteristics according to the comparing result; and a control computer for comparing the parameters for the respective horizontal, vertical and alignment characteristics with a reference parameter and thereby producing control data according to the comparing result, the control data being coupled to the CCTV to equalize distortion of the image pattern.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

A preferred embodiment taken according to the present invention will be described hereinafter in detail, with reference to the accompanying drawings, by only way of an example.

Figure 1:
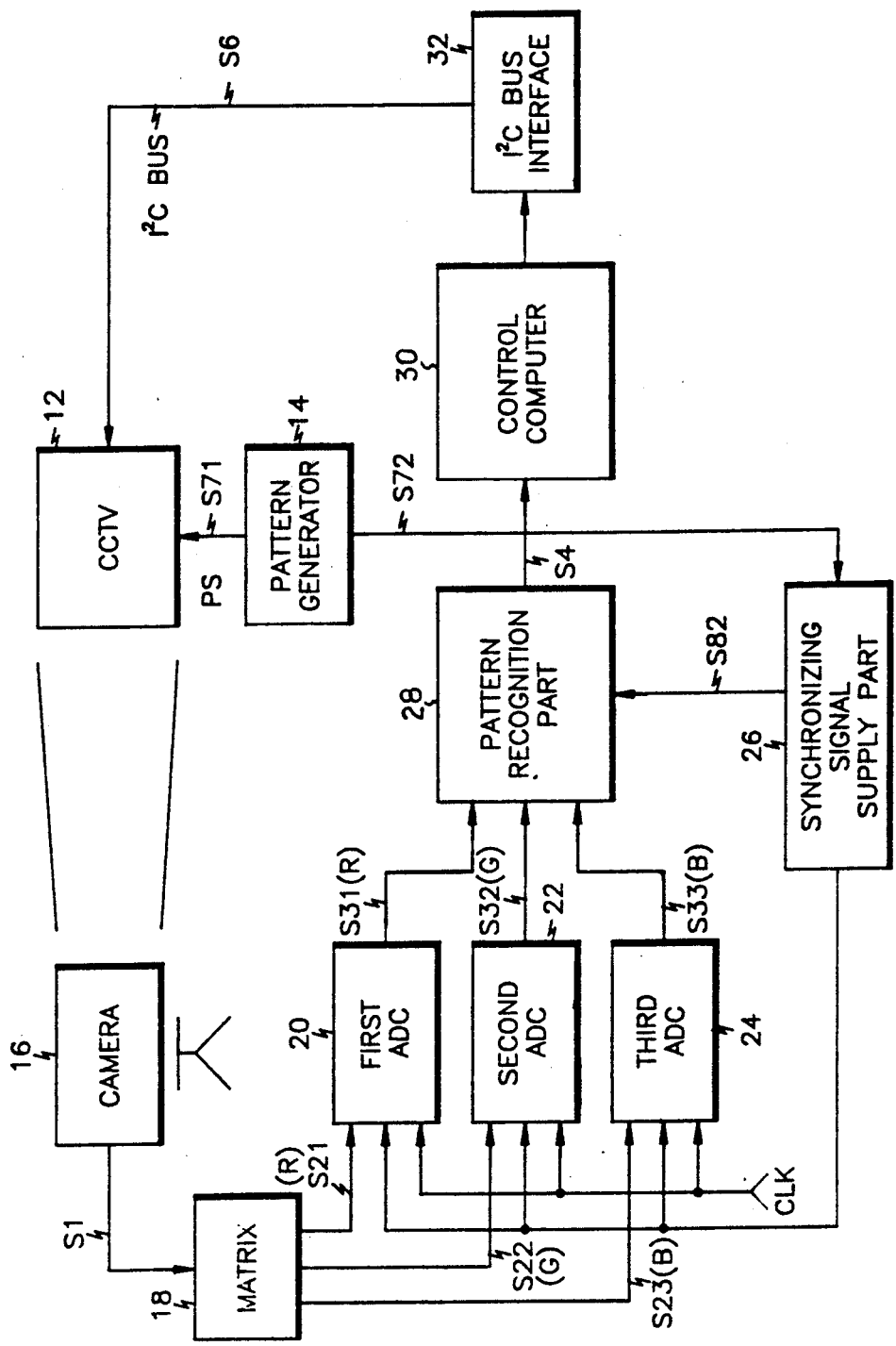
FIG. 1 illustrates a system block diagram of a device for automatically controlling the image pattern of a CCTV according to the present invention.

Referring primarily to FIG. 1, the inventive device for controlling the geometric characteristics of the image pattern includes a general CCTV set 12, in which a deflection circuit (not shown) controls the horizontal and vertical deflection of the image pattern displayed on the CRT thereof, according to the horizontal and vertical deflection control signal, respectively. The CCTV set 12 displays a picture on the CRT, of which geometric characteristics can be controlled by the deflection circuit as programmed in advance by a user. The image pattern displayed on the CRT of the CCTV set 12 is photographed by a video camera 16, and converted into electrical signal. The electrically converted signal is a composite video signal. Then the composite video signal is delivered to a RGB (Red, Green, Blue) matrix 18 for separating the above composite video signal delivered from the video camera 16 into the red, green and blue components.

The separated R, G, B components are respectively provided to a first ADC (Analog-to-Digital Converter) 20 for converting the R component of the analog composite video signal into the R component of a digital video signal, a second ADC 22 for converting the G component of the analog composite video signal into the G component of a digital video signal, and a third ADC 24 for converting the B component of the analog composite video signal into the B component of a digital video signal.

The first, second and third ADC's 20, 22, 24 are provided with the image window synchronous signals from a synchronizing signal supply part 26, whereby the output digital video signals of the first through third ADC's 20, 22, 24 being synchronized with the above synchronous signals. The output of the first through third ADC's 20, 22, 24 are then applied to a pattern recognition part 28 to be compared with a reference value. The reference value is set up (programmed) by a user in advance as desired. From the result of the comparison, the pattern recognition part 28 recognizes the geometric characteristics of the image pattern on the CRT screen to produce corresponding parameters of the horizontal, vertical and alignment characteristics by detecting the respective R, G, B component differences.

Control computer 30 compares the geometric characteristics of the pattern recognition part 28 with the reference geometric characteristics to produce corresponding control data. The control data output from the control computer 30 is delivered via a bus line to a I²C (Inter-Integrated Circuit) bus interface 32 by which the control data is converted suitable for I²C bus line S₆.

Figure 2A:
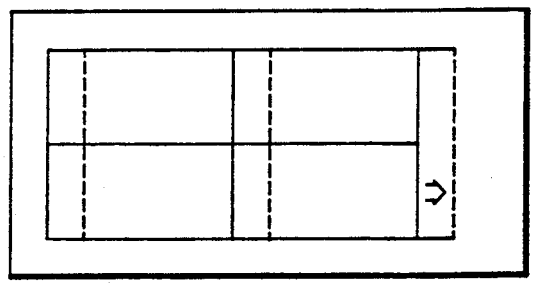
FIGS. 2A through 2C illustrate an example of a mal-aligned image patterns for showing the features and advantages of the invention.
Figure 2B:
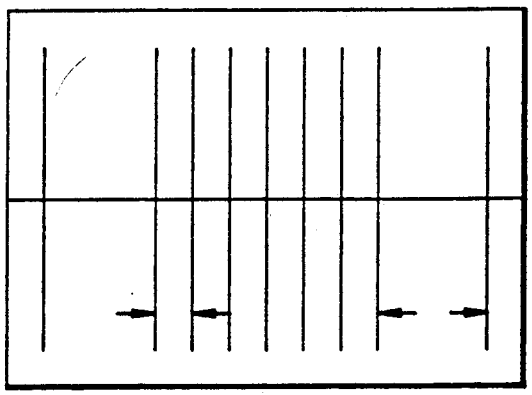
Figure 2C:
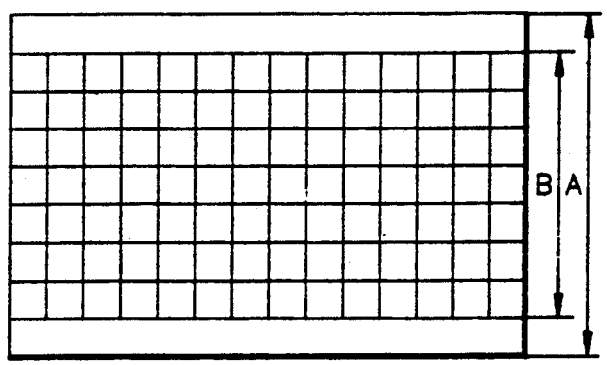

Referring now to FIGS. 2A through 2C, there is described an illustration of an image pattern which is shifted to the left-hand side on the CRT screen of the CCTV set 12, in FIG. 2A. There is shown another description of the image pattern which is malaligned horizontally, in FIG. 2B. In addition, FIG. 2C shows the image pattern of which the vertical image characteristic is reduced.

In operation of the embodiment, if pattern generator 14 applies to the CCTV set 12 the image pattern signal $S_{71}$, the input image pattern will be displayed on the CRT screen of the CCTV set 12. Faced to the CRT screen of the CCTV set 12, the video camera 16 takes the picture of the image pattern displayed on the CRT screen and converts the image signal into a composite video signal which is applied to the RGB matrix 18. The composite video signal applied to the RGB matrix 18 is respectively separated into the chrominance signal of the R, G, B components and then provided to the first through third ADC's 20, 22, 24. Namely, the R component is provided to the first ADC 20, the G component to the second ADC 22, and the B component to the third ADC 24, respectively.

The first through third ADC's 20, 22, 24 sample the respective R, G, B components at a predetermined sampling frequency (clock; CLK) to convert the chrominance signals into the digital video signals, in which the converted digital video signal is synchronized with the image window synchronous signal applied from the synchronizing signal supply part 26, thereby to produce the synchronized digital video signal to the pattern recognition part 28. In this way, the first through third ADC's 20, 22, 24 generate the parameters of the horizontal, vertical and alignment characteristics for the respective R, G, B components.

On the other hand, the synchronizing signal supply part 26 delays the synchronous signal of the image pattern generated from the pattern generator 14 for a predetermined time and controls the pulse width of the synchronous signal so as to provide the synchronous signal to the first through third ADC's 20, 22, 24. In this case, the delay must be made not only to complement the time taken for the R, G, B separation by the first through third ADC's 20, 22, 24, but also to have the ADC's synchronize with the pattern generator 14.

In the meanwhile, the pattern recognition part 28 compares the characteristics of the horizontal, vertical and alignment for the respective R, G, B components produced from the first through third ADC's 20, 22, 24 with the reference characteristics programmed in advance as desired, so as to recognize (detect) the distortion characteristics and to generate to the control computer 30 the parameters corresponding to the distortion characteristics.

For example, if the pattern generator 14 generates an image pattern for the CCTV set 12, then the image pattern is to be displayed on the CRT screen of the CCTV 12. In this occasion, if the image pattern displayed on the CRT screen has inferior horizontal, vertical and alignment characteristics because of the maladjustment of the CCTV set 12, then the image pattern will be distorted as shown in FIGS. 2A-2C.

Accordingly, the respective R, G, B components digitalized by the first through third ADC's are distorted correspondingly and the distorted components are provided to the pattern recognition part 28, which is compared with the reference values programmed by the user.

For the image pattern of FIG. 2A, the pattern recognition part 28 adds or subtracts (i.e., adjusts) the parameter corresponding to the horizontally-distorted image pattern caused by the inferior horizontal characteristic. Next, for the image pattern of FIG. 2B, the parameter corresponding to the alignment characteristic is adjusted by the pattern recognition part 28 to equalize the image pattern mal-aligned. Namely, the central portion of the image of FIG. 2B is compressed while the left and right hand side of the image is spread out. Lastly, for the image pattern of FIG. 2C the parameter corresponding to the vertical characteristic is adjusted to an extent which the image is compressed vertically.

In other word, the pattern recognition part 28 compares the reference values with the parameters of the horizontal, vertical and alignment characteristics for the respective R, G, B components which is the feedback signal to recognize the geometric distortion of the image pattern on the CRT and to provide corresponding parameters to the control computer 30.

Thus, the control computer 30 determines the difference between the input distortion parameters and the reference parameters and provides to the I²C bus interface 32 deflection equalizing data. The I²C bus interface 32 converts the reflection equalizing data into I²C bus data so as to provide control data to the CCTV set 12.

As a result, when the image pattern displayed on the CRT screen of the CCTV set 12 has a narrow, suppressed horizontal and vertical characteristics, the control computer 30 controls the CCTV set via the I²C bus interface 32 to complement (equalize) the suppressed characteristics, by applying the control signal to the deflection circuit.

As described heretofore, the invention recognizes the geometric characteristics of the image pattern displayed on the CRT screen of a CCTV set. The recognized geometric characteristics are compared with the reference characteristics by means of a control computer in order to get deflection equalizing data for controlling the deflection circuit. Therefore, the invention can precisely adjust the television sets and monitors during manufacturing.

While the invention has been particularly shown and described with reference to a preferred embodiment, it will be understood by those skilled in the art that modifications in detail may be made without departing from the spirit and scope of the invention. For example, the video camera can be substituted by a CCD (Charge Coupled Device) image sensor.

In addition, the embodiment described in this specification only discloses the application for the video signal. But, the sound signal can be automatically controlled by replacing the video camera with a microphone and the first through third ADC's with a single ADC for converting the analog signal sensed by the microphone into a digital signal. Of course, the RGB matrix in this case must be excluded.

What is claimed is:

1. A device for controlling an image pattern of a computer-controlled television (CCTV) having a deflecting circuit, comprising:
   a pattern generator for producing an image pattern containing a synchronous signal for display by said CCTV;

means for sensing said image pattern and converting said sensed image pattern into an electrical composite video signal;

means operably connected to said image sensing means, for separating said composite video signal into red, green, and blue components;

first, second and third means for converting said red, green and blue components into red, green and blue digital signals, respectively;

means operably connected to said pattern generator, for providing said synchronous signal to said pattern generator, said synchronous signal being coupled to said respective first second and third converting means, whereby said first, second and third converting means synchronize with said pattern generator;

a pattern recognizer for comparing the output of said first, second and third converting means with a reference pattern programmed in advance to control said CCTV, and for producing parameters for respective horizontal, vertical and alignment characteristics according to said comparing result; and a control computer for comparing said parameters with reference parameters and thereby producing control data according to said comparing result, said control data being coupled to said CCTV to equalize distortion of said image pattern.

2. The device for controlling an image pattern of a CCTV according to claim 1, wherein said device further comprises an interface operably coupled between said CCTV and said control computer so as to convert said control data output from said control computer to a form suitable for controlling said CCTV.

3. The device for controlling an image pattern of a CCTV according to claim 1, wherein said sensing means is a video camera.

4. The device for controlling an image pattern of a CCTV according to claim 1, wherein said respective first, second and third converting means are analog-to-digital converters.

5. The device for controlling an image pattern of a CCTV according to claim 1, wherein said sensing means is a charge-coupled device image sensor.

6. The device for controlling an image pattern of a CCTV according to claim 1, wherein said sensing means is a LED light sensor.

* * * * *